US009539752B2

(12) United States Patent
Dubois et al.

(10) Patent No.: US 9,539,752 B2
(45) Date of Patent: Jan. 10, 2017

(54) CONTINUOUS CELLULOID TWIN SCREW EXTRUSION PROCESS

(71) Applicant: General Dynamics Ordnance and Tactical Systems—Canada Valleyfield Inc., Salaberry-de-Valleyfield (CA)

(72) Inventors: Charles Dubois, Brossard (CA); Etienne Comtois, Montreal (CA)

(73) Assignee: General Dynamics Ordnance and Tactical Systems—Canada Valleyfield, Inc., Salaberry-de-Valleyfield (CA)

( * ) Notice: Subject to any disclaimer, the term of this patent is extended or adjusted under 35 U.S.C. 154(b) by 379 days.

(21) Appl. No.: 14/167,812

(22) Filed: Jan. 29, 2014

(65) Prior Publication Data
US 2015/0042008 A1    Feb. 12, 2015

Related U.S. Application Data

(60) Provisional application No. 61/864,331, filed on Aug. 9, 2013.

(51) Int. Cl.
| B29C 47/40 | (2006.01) |
| B29C 47/76 | (2006.01) |
| B29C 47/00 | (2006.01) |
| B29C 71/00 | (2006.01) |
| B29C 47/10 | (2006.01) |
| B29C 47/92 | (2006.01) |

(Continued)

(52) U.S. Cl.
CPC ......... *B29C 47/0004* (2013.01); *B29C 47/004* (2013.01); *B29C 47/0021* (2013.01); *B29C 47/0066* (2013.01); *B29C 47/0896* (2013.01); *B29C 47/1063* (2013.01); *B29C 47/1081* (2013.01); *B29C 47/40* (2013.01);
(Continued)

(58) Field of Classification Search
CPC .... B29C 47/0004; B29C 47/004; B29C 47/92; B29C 47/0021; B29C 47/0066; B29C 47/0896; B29C 47/1063; B29C 47/767; B29C 47/1081; B29C 47/40; B29C 71/0009; B29C 47/42; B29C 47/0083; B29C 47/0869; B29C 47/76; B29C 47/0071; B29C 2947/92514; B29C 2947/92704; B29C 2071/0027; C08B 5/02; C08B 31/52; C08L 1/18; D10B 2201/26; C06B 31/54; C06B 21/0016; C06B 31/22; C06B 21/0091; C06B 25/18; D01F 2/26; Y02P 70/263; B29K 2001/18; B29K 2105/0005
See application file for complete search history.

(56) References Cited

U.S. PATENT DOCUMENTS 1,836,946 A * 12/1931 Walsh ...................... C08L 1/18
                                                        264/217
1,837,855 A    12/1931 Esselen, Jr. et al.
(Continued)

FOREIGN PATENT DOCUMENTS

GB              378052            8/1932

OTHER PUBLICATIONS

International Bureau of WIPO, International Search Report on Patentability in International Application No. PCT/CA2014/050756 mailed Feb. 18, 2016.
(Continued)

*Primary Examiner* — Jeffrey Wollschlager
(74) *Attorney, Agent, or Firm* — Lorenz & Kopf, LLP (LKGlobal)

(57) ABSTRACT

The present disclosure relates to a continuous extrusion process for producing a celluloid article including several steps and a celluloid article prepared by the continuous extrusion process.

9 Claims, 4 Drawing Sheets

(51) Int. Cl.
  *C06B 31/22*  (2006.01)
  *C06B 21/00*  (2006.01)
  *C06B 25/18*  (2006.01)
  *D01F 2/26*  (2006.01)
  *C06B 31/54*  (2006.01)
  *C06B 31/52*  (2006.01)
  *C08B 5/02*  (2006.01)
  *C08L 1/18*  (2006.01)
  *B29C 47/08*  (2006.01)
  *B29C 47/42*  (2006.01)
  *B29K 1/00*  (2006.01)
  *B29K 105/00*  (2006.01)

(52) U.S. Cl.
  CPC ............ *B29C 47/767* (2013.01); *B29C 47/92* (2013.01); *B29C 71/0009* (2013.01); *B29C 47/0071* (2013.01); *B29C 47/0083* (2013.01); *B29C 47/0869* (2013.01); *B29C 47/42* (2013.01); *B29C 47/76* (2013.01); *B29C 2071/0027* (2013.01); *B29C 2947/92514* (2013.01); *B29C 2947/92704* (2013.01); *B29K 2001/18* (2013.01); *B29K 2105/0005* (2013.01); *C06B 21/0016* (2013.01); *C06B 21/0091* (2013.01); *C06B 25/18* (2013.01); *C06B 31/22* (2013.01); *C06B 31/52* (2013.01); *C06B 31/54* (2013.01); *C08B 5/02* (2013.01); *C08L 1/18* (2013.01); *D01F 2/26* (2013.01); *D10B 2201/26* (2013.01); *Y02P 70/263* (2015.11)

(56) References Cited

U.S. PATENT DOCUMENTS

| | | | |
|---|---|---|---|
| 1,851,244 A | | 3/1932 | Esselen, Jr. |
| 1,956,564 A | | 5/1934 | Crane et al. |
| 1,979,762 A | | 11/1934 | O'Kane et al. |
| 2,019,119 A | | 10/1935 | Crane et al. |
| 2,146,532 A | | 2/1939 | Crane et al. |
| 3,423,841 A | * | 1/1969 | Ocker ................. C06B 21/0091 34/183 |
| 4,120,920 A | * | 10/1978 | Cougoul ............ B29C 47/0825 149/96 |
| 4,525,313 A | * | 6/1985 | Muller .................... B30B 11/24 149/109.6 |
| 4,608,210 A | * | 8/1986 | Muller ................ C06B 21/0075 264/3.2 |
| 4,670,200 A | * | 6/1987 | Helle ................ C06B 21/0016 264/3.3 |
| 4,744,669 A | * | 5/1988 | Kowalczyk ............... B29B 7/48 222/413 |
| 4,759,824 A | * | 7/1988 | Muller .................... B29C 47/40 100/117 |
| 4,767,577 A | * | 8/1988 | Muller .................... B30B 11/24 149/100 |
| 5,251,531 A | * | 10/1993 | Miehling .............. B30B 11/224 264/3.3 |
| 5,266,242 A | * | 11/1993 | Mogendorf ......... C06B 21/0075 149/109.6 |
| 5,487,851 A | * | 1/1996 | Dillehay ............... C06B 45/105 264/3.3 |
| 7,473,330 B2 | * | 1/2009 | Ryf .................... C06B 21/0083 149/109.4 |
| 2009/0199938 A1 | * | 8/2009 | Gottwald ................ C06B 25/18 149/92 |

OTHER PUBLICATIONS

Canadian Intellectual Property Office International Searching Authority, International Search Report and Written Opinion for International Application No. PCT/CA2014/050756, mailed Oct. 23, 2014.

* cited by examiner

CONTINUOUS CELLULOID TWIN SCREW EXTRUSION PROCESS

CROSS-REFERENCE TO RELATED APPLICATION

The present application claims the benefit of priority to U.S. Provisional Patent Application Ser. No. 61/864,331, filed on Aug. 9, 2013, the contents of which are herein incorporated by reference in their entirety.

TECHNICAL FIELD

Broadly, the present disclosure relates to extrusion and extrusion processes. More particularly, the present disclosure relates to continuous celluloid twin screw extrusion processes.

BACKGROUND

Historically, celluloid was often seen as the first plastic matter of industrial relevance. Contemporary to the fast industrialization of late $19^{th}$ century and early $20^{th}$ century, it rapidly became a workhorse material for commodity products. Its origin and production are found in the following patents:

Charles E. When, "Method of Shaping Pyroxylin, Celluloid, And Like Materials", U.S. Pat. No. 1,461,299, dated Jul. 10, 1923.

William G. Lindsay, "Process of Making Sheets of Pyroxylin Compound" U.S. Pat. No. 1,468,820, dated Sep. 25, 1923. The ancestor of celluloid, Parkesine, was developed by an Englishman named Alexander Parkes in 1862. He discovered that a mixture of cellulose treated with nitric acid and different solvents had thermoforming abilities. Unfortunately, the lack of plasticizer in its formulation resulted in a material that would crack over time making high scale production impossible. This was until John Wesley Hyatt discovered that camphor was a natural solvent for nitrocellulose making the material the first thermoplastic produce on an industrial level (see U.S. Pat. No. 88,663, dated Apr. 6, 1869, antedated Mar. 25, 1869). Hyatt decided to name his disclosure "celluloid".

Due to its thermoforming and combustion characteristics, celluloid is a very interesting product for the armament industries. Mortar increment made of celluloid sheets has been used as a container for propellants.

There are two processes currently used in order to produce celluloid sheets on an industrial scale: The block method, in which a uniform block of celluloid is cut into thin individual sheets, and the lacquer method in which the celluloid is dissolved in lacquer, spread on a conveyor belt and dried.

As explained above, the bloc method consists of making a block of celluloid followed by cutting into sheets. Typically, there are six main steps: mixing using a sigma blade mixer, plastifying using a "roll-mill" apparatus, blocking, cutting, drying and final shaping.

Using a sigma blade mixer, the nitrocellulose and camphor are mixed together in the presence of ethanol and acetone is added in order to be able to mix the dough thoroughly and ensure no undissolved nitrocellulose remains. The mixed dough is split in fractions and moved to a "two roll-mill" heated where every fraction is processed individually using a two roll mill and piled on top of each other to form a thick celluloid carpet. The thick carpet is moved to a jacketed heated press. Heat and pressure are applied on the material for between 8 and 12 hours typically. The resulting block is cooled down and oscillated back and forth on a hydraulic table equipped with a knife. The knife cuts a thin slice of the block each time as the block is passing underneath.

In order to reach the correct solvent ratio the sheets are suspended on a rack and dried in a room using hot air blowers. The sheets are piled on top of each other and placed in a multiple deck press where they are heated for 40 minutes to soften the celluloid sheets and make sure that they come out straight and flat. An optional cutting step is performed to give the final dimensions to the sheet.

The block method has several disadvantages, primary among them is the fact that it can only be carried out as a batch process. This results in slower production and higher costs.

The lacquer method is a method of celluloid production that is performed by first dissolving the raw material (nitrocellulose, camphor, optional stabilizer, etc.) in solvent and pouring the solution in a continuous strip on a conveyor belt where the solvent is removed leaving a clear continuous sheet of celluloid at the end of the conveyor.

This method is a continuous process and is inherently more efficient than the block method above. However, the lacquer method also bears several disadvantages including: the thicknesses of the sheets are less consistent than the block method. Depending on the thickness of the celluloid sheets, there will be residual solvents in the final product which can result in end-user processability problems. In addition, the amount of solvent that needs to be recovered is much higher than with the block method and if a foaming agent is required, the uniformity of the foaming agent concentration in the celluloid lacquer cannot be predicted.

U.S. Pat. No. 4,120,920 describes and teaches a process for the production of extrusions formed of compositions based on plasticized nitrocellulose and a method of continuous production of propellant extrusions based on nitrocellulose gelled with an explosive oil and with a screw-extruder for carrying out such a method.

U.S. Pat. No. 1,979,762 describes and teaches batch compounding process for preparing pyroxylin (nitrocellulose) sheets where the pyroxylin is in the form of a colloidal gel of bread-dough stiffness and extruded through an orifice and formed into a soft web containing a considerable amount of solvent.

United States Patent Application Publication No. 2008/0242794 describes and teaches a polymer composition, including celluloid, including a melt-processed polymer compounded with a colour stabilizer and a silver-based antimicrobial agent.

U.S. Pat. No. 4,608,210 describes and teaches a method for producing plastically bonded propulsion powders or explosives by means of an extruder consisting of two co-rotating or counter-rotating screw shafts and a forming head.

US Patent Application Publication No. 2002/0079031 describes and teaches a methodology where solids including acrylic gum/guanidine nitrate, oxidizing filler and additives, and liquids are separately introduced into a twin-screw mixer-extruder, conveyed and kneaded to form a paste, degassed and extruded in the form of rods.

U.S. Pat. No. 2,171,095 describes and teaches an extrusion apparatus used for extruding plastics such as pyroxylin (nitrocellulose) into solid block forms which are subsequently adapted to provide patterns, designs and colour effects.

Thus there exists a need for a continuous extrusion process for preparing cost-effective celluloid of various geometries having uniform properties. Further, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

In one aspect of the disclosure there is provided a continuous extrusion process for preparing celluloid articles including the steps of:

providing a quantity of nitrocellulose;

providing a quantity of camphor;

providing an extruder defining a chamber, an opening for receiving materials into said chamber, at least two screws for mixing material in said chamber, and an extrusion die coupled to said chamber for extruding material located in said chamber; said chamber including a first zone, a second zone, a third zone and a devolatilization zone or a combination thereof;

introducing the nitrocellulose into said first zone of said chamber, said first zone being maintained at a temperature where the nitrocellulose will not self-ignite, preferably between about 5° C. to about 15° C.;

dissolving said camphor in a low boiling point solvent and introducing said camphor into said first zone or said second zone of said chamber;

adding an additional solvent to said first zone or said second zone;

transporting said nitrocellulose into said second zone of said chamber;

continuously mixing said nitrocellulose, camphor and solvent in the said second zone to form a mixture;

transporting said mixture to said third zone of said chamber and further continuously mixing said mixture at a higher rate of mixing and temperature relative to said first zone;

transporting said mixture to said devolatilization zone and extracting solvent from the mixture in said devolatilization zone by heating the mixture to above boiling points of said solvents;

extruding said mixture through said die to produce a celluloid article; and removing the solvents from said celluloid article.

In another aspect of the disclosure there is provided a celluloid article prepared by a process including the steps of:

providing a quantity of nitrocellulose;

providing a quantity of camphor;

providing a twin screw extruder defining a chamber, an opening for receiving materials into said chamber, at least two screws for mixing material in said chamber, and an extrusion die coupled to said chamber for extruding material located in said chamber; said chamber having sequentially a first zone, a second zone, a third zone and a devolatilization zone;

introducing the nitrocellulose into said first zone of said chamber, said first zone being maintained at a temperature where the nitrocellulose will not self-ignite, preferably between about 5° C. to about 15° C., dissolving said camphor in a low boiling point solvent and introducing said camphor into said second zone of said chamber;

adding an additional solvent to said first zone;

transporting said nitrocellulose into said second zone of said chamber;

continuously mixing said nitrocellulose, camphor and solvent in the said second zone to form a mixture;

transporting said mixture to said third zone of said chamber and further continuously mixing said mixture at a higher rate of mixing and temperature relative to said first zone;

transporting said mixture to said devolatilization zone and extracting solvent from the mixture in said devolatilization zone by heating the mixture to above boiling points of said solvents;

extruding said mixture through said die to produce a celluloid article; and removing the solvents from said celluloid article.

In another aspect of the disclosure there is provided a celluloid material prepared by a process including the steps of providing a quantity of nitrocellulose;

providing a quantity of solid camphor;

providing a twin screw extruder defining a chamber, an opening for receiving materials into said chamber, at least two screws for mixing material in said chamber, and an extrusion die coupled to said chamber for extruding material located in said chamber; said chamber having a first zone, a second zone, a third zone and a devolatilization zone;

introducing the nitrocellulose into said first zone of said chamber, said first zone being maintained at a temperature where the nitrocellulose will not self-ignite, preferably between about 5° C. to about 15° C., adding an additional solvent to said first zone;

transporting said nitrocellulose into said second zone of said chamber;

continuously mixing said nitrocellulose, camphor and solvent in the said second zone to form a mixture;

transporting said mixture to said third zone of said chamber and further continuously mixing said mixture at a higher rate of mixing and temperature relative to said first zone;

transporting said mixture to said devolatilization zone and extracting solvent from the mixture in said devolatilization zone by heating the mixture to above boiling points of said solvents;

extruding said mixture through said die to produce a celluloid article; and removing the solvents from said celluloid article In another aspect of the disclosure there is provided a continuous extrusion process for preparing celluloid articles including the steps of:

providing a quantity of nitrocellulose;

providing a quantity of camphor;

providing an extruder defining a chamber, an opening for receiving materials into said chamber, means for mixing material in said chamber, and an extrusion die coupled to said chamber for extruding material located in said chamber; said chamber including a first zone, a second zone and a devolatilization zone or a combination thereof;

introducing the nitrocellulose into said first zone of said chamber, said first zone being maintained at a temperature where the nitrocellulose will not self-ignite, preferably between about 5° C. to about 15° C.;

dissolving said camphor in a low boiling point solvent and introducing said camphor into said first zone or said second zone of said chamber;

adding an additional solvent to said first zone or said second zone;

transporting said nitrocellulose into said second zone of said chamber;

continuously mixing said nitrocellulose, camphor and solvent in the said second zone to form a mixture;

transporting said mixture to said devolatilization zone and extracting solvent from the mixture in said devolatilization zone by heating the mixture to above boiling points of said solvents;

extruding said mixture through said die to produce a celluloid article; and removing the solvents from said celluloid article.

In another aspect of the disclosure, the continuous extrusion process can be automated wherein the process does not require operator intervention.

In yet another aspect of the disclosure the low boiling point solvent used for the camphor solution and the additional solvent can be the same or different and are selected from the group consisting of a low molecular weight aliphatic ketone, a low molecular weight aliphatic alcohol and mixtures thereof.

In yet another aspect of the disclosure, the celluloid article can be in the form of a sheet, a rod or a tube.

Further and other aspects will be appreciated by the skilled reader.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE FIGURES

The present disclosure will hereinafter be described in conjunction with the following drawing figures, wherein like numerals denote like elements, and wherein.

DETAILED DESCRIPTION

The present disclosure is directed to a continuous compounding and extrusion process for preparing celluloid material that has the advantage of being a highly automated, versatile process which allows for a continuous production of a uniform product. The celluloid material may be in the form of sheets and other geometries such as tubes and rods.

Figure 1:
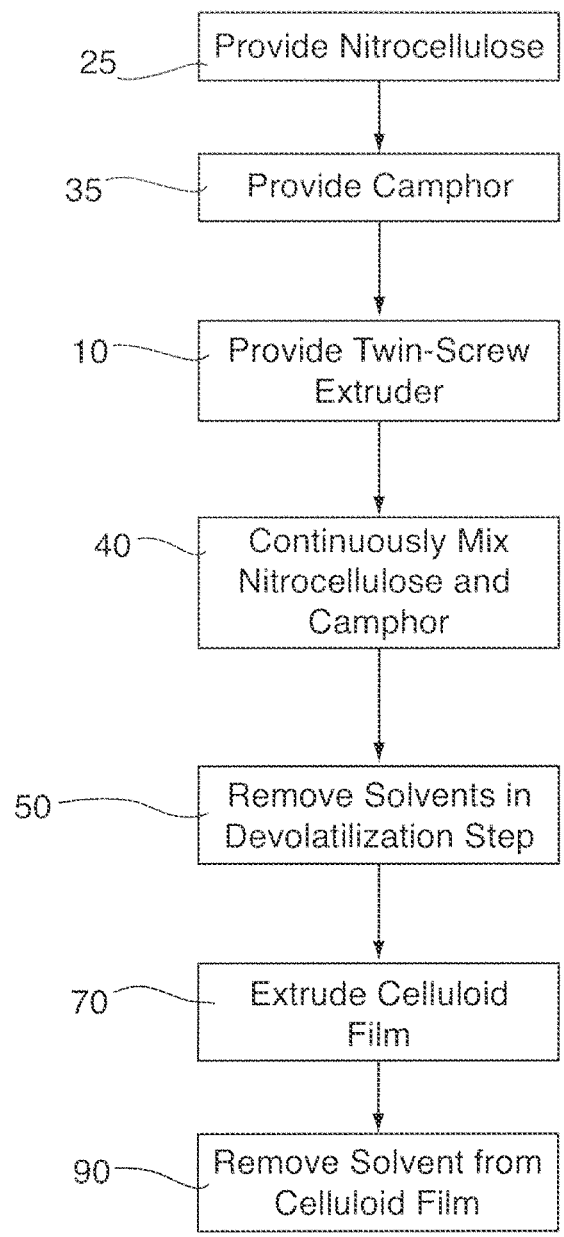
FIG. 1 shows a block diagram of the process of the present disclosure.
Figure 2:
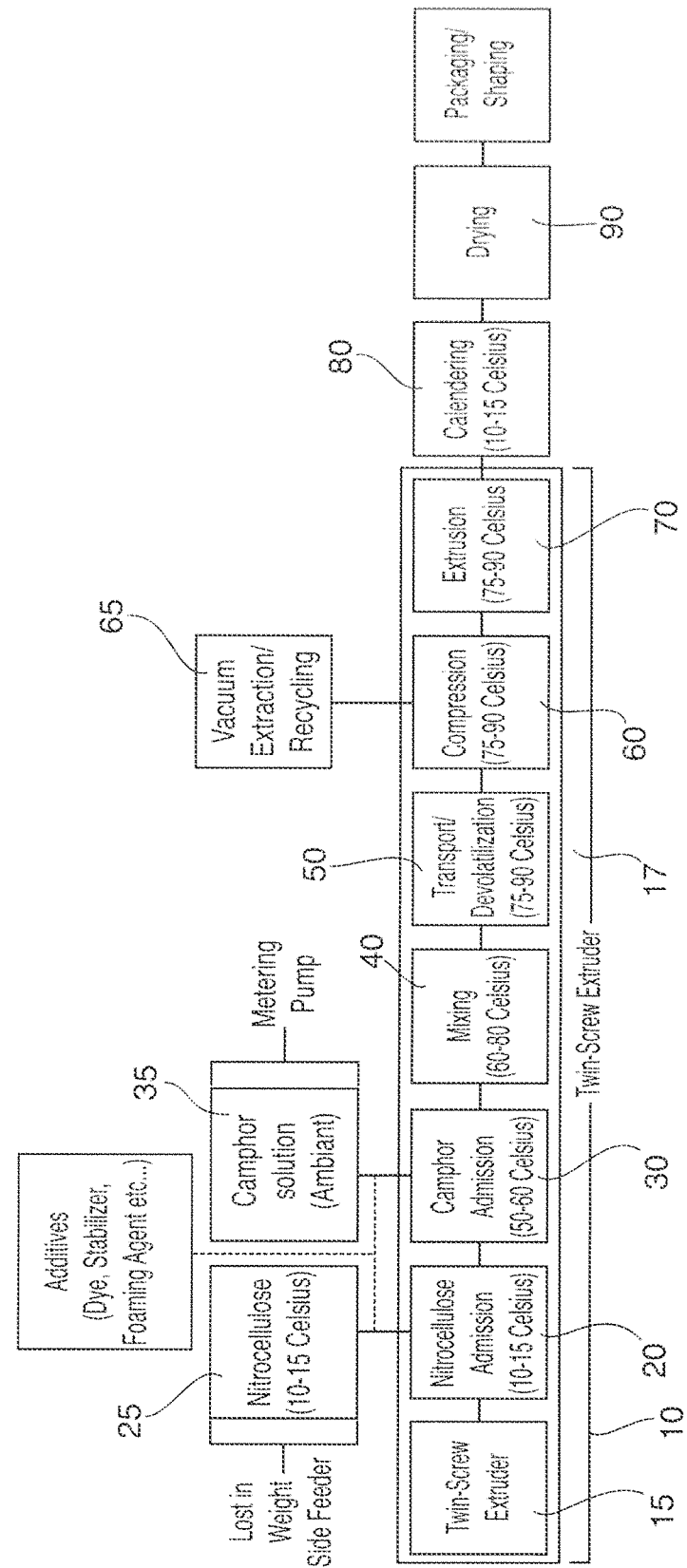
FIG. 2 shows a schematic of an embodiment of the process of the present disclosure.

With reference to FIGS. 1 and 2, the continuous compounding and extrusion process is carried out with the steps of providing a quantity of nitrocellulose 25; providing a quantity of camphor 35; providing a twin screw extruder 10 defining a chamber 17, an opening 18 for receiving materials into said chamber, at least two screws 15 for mixing material in said chamber 17, and an extrusion die 70 coupled to said chamber 17 for extruding material located in said chamber; said chamber preferably having a first zone 20, a second zone 30, a third zone 40 and a devolatilization zone 50 or a combination of thereof; transporting the nitrocellulose into said first zone 20 of said chamber 17, said first zone 20 being maintained at a temperature preferably between about 5° C. to about 15° C.; dissolving said camphor in a low boiling point solvent and introducing said camphor 35 into said second zone 30 of said chamber 17; adding an additional solvent to said first zone 20 and continuously mixing said nitrocellulose, camphor and solvent in the said second zone 30 to form a mixture; transporting said mixture to said third zone 40 of said chamber 17 and further continuously mixing said mixture at a higher rate of mixing and temperature relative to said first zone; transporting said mixture to said devolatilization zone 50 and extracting solvent from the mixture in said devolatilization zone 50 by heating the mixture to above boiling points of said solvents; extruding said mixture through said die 70 to produce a film of celluloid 100; and removing the solvents from said celluloid article 100. In certain embodiments, there can be multiple devolatilization zones. In other embodiments, the first zone, the second zone and the third zone can be interchangeable. In alternative embodiments, the camphor can be introduced as a solid with an appropriate metering device.

The disclosure is not limited to the number of zones. In certain embodiments, the process can be carried out with one or two zones in addition to a devolatilization zone. Zones can be added and interchanged to provide the desired texture to the resultant celluloid article. For example, it is possible to provide a mixing zone followed by a devolatilization zone followed by another mixing zone to ensure the celluloid material is well blended. It is also possible to introduce a solvent before introducing nitrocellulose in order to provide desensitization and render the material less prone to self-ignition or ignition by friction.

The raw materials are preferably commercial grade nitrocellulose dehydrated with a solvent and a camphor solution. The nitrocellulose can have a degree of nitration from about 10% to about 13%. Solvents known in the art for dehydrating nitrocellulose may be used. Preferably, the solvent used to dehydrate the nitrocellulose is selected from the group consisting of a low molecular weight aliphatic ketone, a low molecular weight aliphatic alcohol and mixtures thereof, more preferably the low molecular weight aliphatic ketone is acetone and the low molecular weight aliphatic alcohol is methanol or ethanol and most preferably the solvent is acetone.

In order to proceed in the safest manner possible, the nitrocellulose is provided to the first zone 20 of the extruder which is water cooled to a range of about 5° C. to about 25° C., most preferably about 10° C. to about 15° C. Optionally if desired, a foaming agent in solid or solution form can be mixed in the nitrocellulose prior to its addition in the extruder or dissolved in the camphor solution. In certain embodiments, as an additional precaution, the camphor solution is provided in the second zone 30, ensuring a complete desensitization of the nitrocellulose fibers. Preferably, when the solvent is acetone the second zone 30 is maintained at a temperature of from about 40° C. to about 70° C., more preferably from about 50° C. to about 60° C. The extruder 10 preferably has a large length/diameter (L/D) ratio to satisfy the mixing and evaporation steps The extruder is preferably a twin screw extruder. A preferred extruder for the purposes of the present disclosure is a Leistritz model having 20 mm outside diameter extruding screws with an L/D ratio of 40. However a person skilled in the art will appreciate that other extruders with means to mix the contents of the mixture to be extruded are within the scope of the present disclosure. The nitrocellulose/camphor mixture is preferably mixed in the extruder in the third zone 40 at a temperature from about 50° C. to about 90° C., more preferably from about 60° C. to about 80° C. to form a celluloid material having a satisfactory plasticity as would be understood by a person of skill in the art. The devolatilization zone 50 is maintained at temperature from about 65° C. to about 100° C., more preferably from about 75° C. to about 90° C. to extract as much solvent as possible before extrusion through the extrusion die 70. A compression zone 60 compresses the celluloid material at a temperature from about 65° C. to about 100° C., more preferably from about 75° C. to about 90° C. while removing and optionally recycling 65 the extracted solvent from the devolatilization zone 50. The resulting celluloid material is extruded in a die 75 at a temperature from about 65° C. to about 100° C., more preferably from about 75° C. to about 90° C., to form a celluloid article 100. The die may be in the form of a slit or other geometries. In certain embodiments, the celluloid article is a film which further is processed through a calendering machine 80 to achieve the desired thickness of the film. The warm film 100 is then passed through at least one hot water bath 90 having a temperature of about 40° C. to about 60° C. to extract any residual solvents. An optional weathering step, where final traces of solvents are evaporated at room temperature, can be scheduled prior to final packaging in order to ensure the dimensional integrity of the sheets and prevent them from sticking together.

Figure 3:
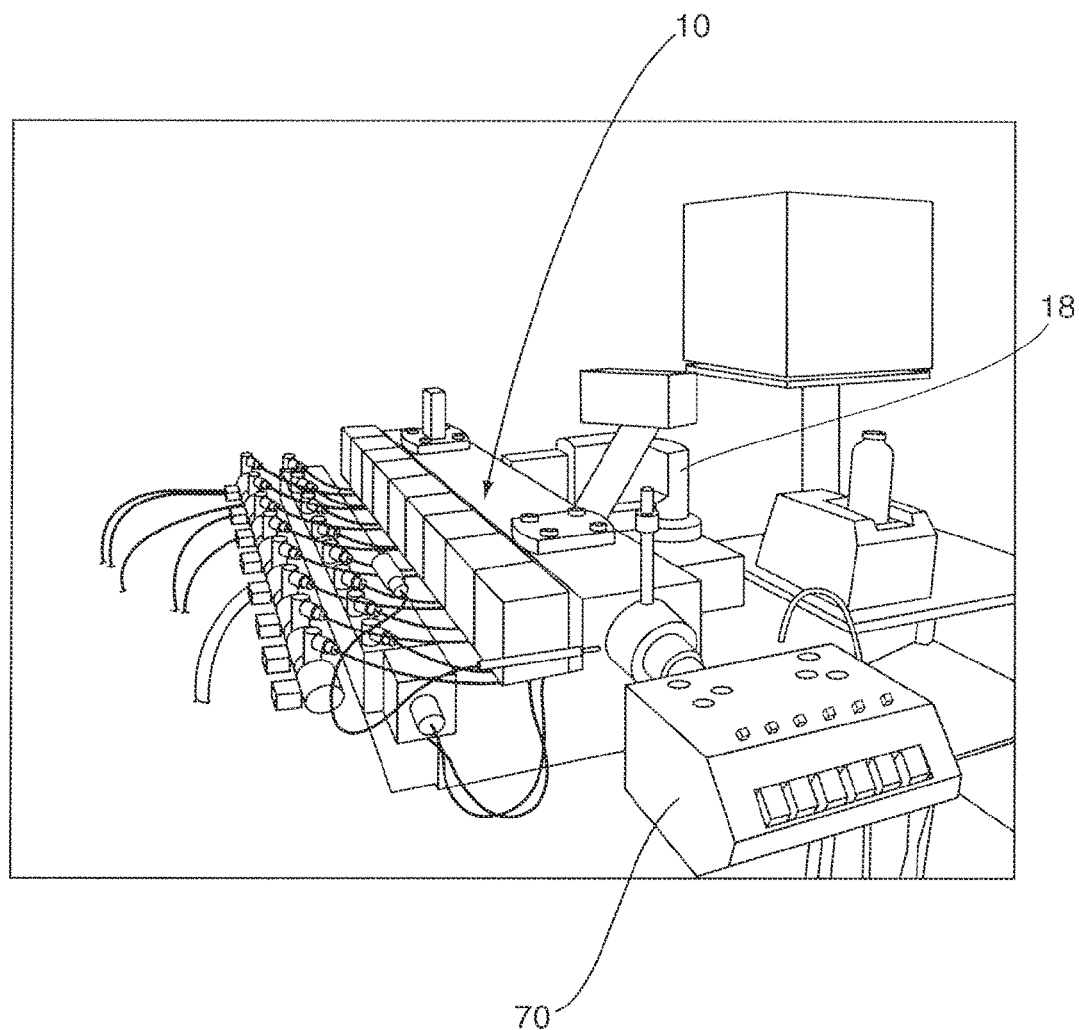
FIG. 3 shows a photograph of a preferred apparatus for carrying out the process of the present disclosure.
Figure 4:
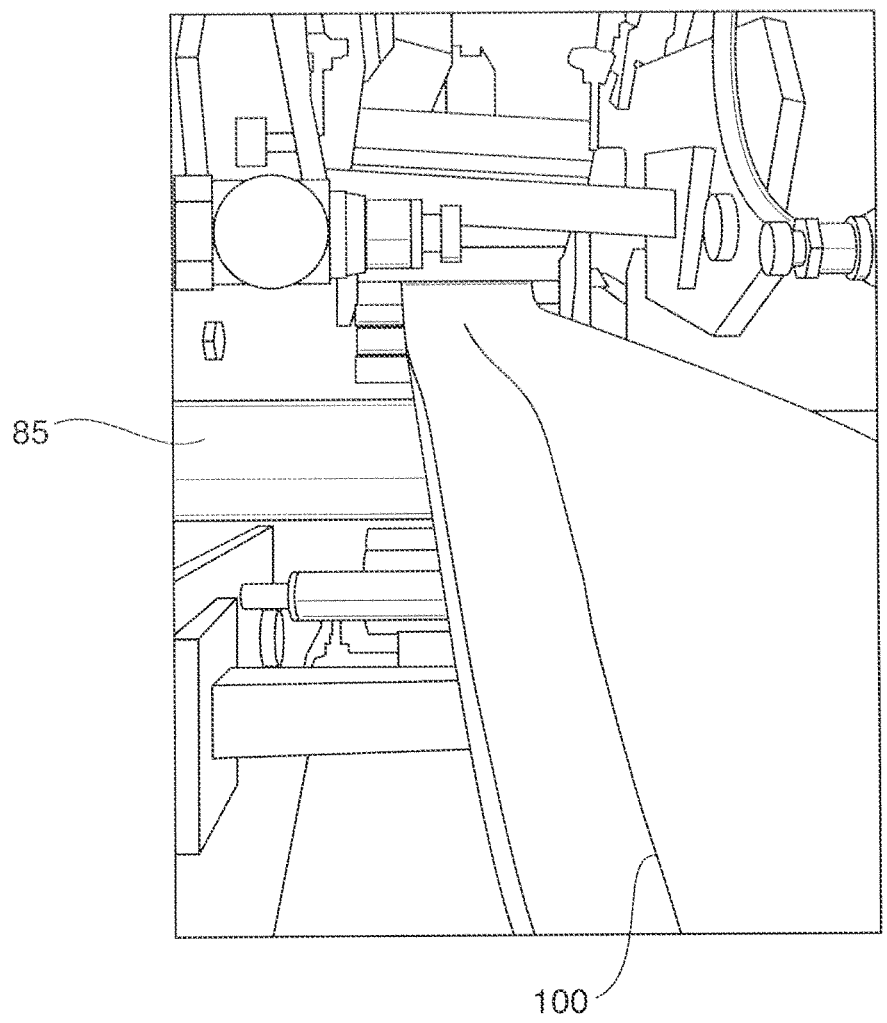
FIG. 4 shows a photograph of a formed celluloid film prepared by the process of the present disclosure.

FIGS. 3 and 4 show photographs of an especially preferred apparatus for carrying out the extrusion process of the present disclosure.

In a preferred embodiment, dry nitrocellulose fibers 25 are fed into a water-cooled first zone 20 of a chamber 17 of a twin screw extruder 10 at a temperature preferably from about 5° C. to about 25° C., most preferably about 10° C. to about 15° C., controlled by automatic feeders operated by a weight loss feedback loop. It is thus advantageously possible to exactly feed the right ratio of nitrocellulose to camphor in order to produce celluloid. Camphor 35 can be incorporated as a solution in a low boiling point solvent such as, but not limited, to methanol, ethanol, acetone and mixtures of thereof. The solution can be injected directly into a second zone 30 of the chamber 17 of the twin screw extruder 10 at a temperature from about 40° C. to about 70° C., more preferably from about 50° C. to about 60° C. using, for example, a dosing pump to remove any irregularities or variations in the addition of raw material.

In the twin screw extruder 10, the nitrocellulose and camphor mixture is subjected to continuous kneading in the third zone 40 by the screw elements 15 at a temperature from about 50° C. to about 90° C. and more preferably from about 60° C. to about 80° C. to form a celluloid dough material. Optionally, the screw elements 15 can be changed better to control the properties of the celluloid dough, for example, viscosity. The screw elements may be varied to provide different kneading rates. Optionally, the rheological properties of the celluloid dough can be assessed by means of on-line torque measurements and pressure readings, and adjusted by applying a correction to the process, if desired.

One or more devolatilization zones 50 extracts as much solvent as possible before extruding the celluloid material through the extrusion die 70. The devolatilization temperature is preferably from about 65° C. to about 100° C., more preferably from about 75° C. to about 90° C. A subsequent compression zone 60 removes the extracted solvent at a temperature from about 65° C. to about 100° C., more preferably from about 75° C. to about 90° C. and optionally recycles the solvent. There can be more than one devolatilization zone along the extrusion barrel.

The extrusion speed is controlled by adjusting the speed of rotation of the screws 15 coupled to the feeding rate of the nitrocellulose and camphor raw materials. The speed can be varied from about 50 rpm to about 200 rpm and more preferably from about 60 rpm to about 100 rpm. A person skilled in the art will appreciate that the speed of rotation will vary depending on the size of the screw that is used. The speed at which the extruded celluloid material exits the twin screw extruder 10 through the extruder die 70 is governed by the rotation speed of the screws 15 and can be varied from about 5 millimeters per second to about 50 millimeters per second. Extrusion of the celluloid material using the die 70 is carried out at a temperature from about 65° C. to about 100° C., more preferably from about 75° C. to about 90° C., to form a celluloid article 100. In a most preferred embodiment, the celluloid material is extruded using a slit die to form a celluloid film.

When the celluloid article 100 is a celluloid film, the shaping of the celluloid article 100 can be continuously carried out by means of a calendering step 80. The calendering step 80 uses two or more calendering rollers 85 cooled to shape the celluloid article 100. During this step, there is very low compression applied on the sheet. The sheet is pulled with very little deformation applied by the rollers. The rollers may be liquid cooled, preferably water cooled. The temperature of the cooled rollers 85 is preferably from about 5° C. to about 25° C., more preferably from about 10° C. to about 15° C. This allows for a constant thickness of the celluloid article 100 which optionally can be monitored by a micrometer or an optical sensor.

A continuous drying step 90 is carried out on the celluloid article 100 that exits the calendering step 80 by passing the article through one or more water baths 95 heated at different temperatures ranging between about 40° C. to about 95° C.

Once the celluloid article 100 is dried, it can be rolled and shipped to consumers allowing them to easily design their own continuous process using a roll of celluloid instead of having to load their equipment with individual sheets.

The process of the present disclosure is advantageous over the prior art block method because the block method requires the use of several pieces of traditional equipment. Such equipment is not installed close to one another for safety reasons. Furthermore, this method requires direct human interaction with large pieces of metal in motion, heavy lifting and sharp edges. This means that the block method requires significant investment in operator safety guards to make the process safe for its operators. The continuous twin screw extrusion process of the present disclosure allows the process to be completed in a single production facility thus minimizing unnecessary handling of the material, minimizing the risk of handling error and reducing costs.

The process is easily adaptable to changes in the raw materials, can make celluloid in various shapes and thicknesses and can be used to directly extrude foamed products.

ILLUSTRATIVE EXAMPLE

The present disclosure is now illustrated by the following non-limiting example. It should be noted that various changes and modifications can be applied to the following example and processes without departing from the scope of this disclosure, which is defined in the appended claims. Therefore, it should be noted that the following example should be interpreted as illustrative only and not limiting in any sense.

The following non-limiting example is provided.

The two raw materials are fed to the counter-rotating twin-screw extruder: a medium molecular weight commercial grade nitrocellulose dehydrated with alcohol and an acetone solution of camphor. The nitrocellulose nitrated to 11.3% and containing 12% ethanol was fed to a 20 mm twin screw extruder of L/D ratio of 40 at a rate of 50 g/min. Simultaneously, a 75% w/w acetone solution of camphor was pumped in the extruder at a rate of 9 ml/min. Extrusion through a 150 mm flat die produced a film of good quality with a nominal thickness of 1 mm as shown in FIG. 3. No decolouration or degradation of the material was observed during the extrusion process.

The scope of the claims should not be limited by the preferred embodiment set forth in the examples, but should be given the broadest interpretation consistent with the description as a whole.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope as set forth in the appended claims and their legal equivalents.

What is claimed is:

1. A continuous extrusion process for producing a celluloid article comprising the steps of:
   providing a quantity of nitrocellulose;
   providing a quantity of camphor;
   providing an extruder defining a chamber, an opening for receiving materials into said chamber, at least two screws for mixing material in said chamber, and an extrusion die coupled to said chamber for extruding material located in said chamber; said chamber comprising a first zone, a second zone, a third zone and a devolatilization zone;
   introducing the nitrocellulose into said first zone of said chamber;
   dissolving said camphor in a low boiling point solvent selected from the group consisting of: methanol, ethanol, acetone, and mixtures thereof, to form a camphor solution, and introducing said camphor solution into said first zone or said second zone of said chamber;
   adding an additional solvent to said first zone or said second zone;
   transporting the nitrocellulose into said second zone of said chamber;
   continuously mixing said nitrocellulose, camphor solution, and additional solvent in said second zone to form a mixture;
   transporting said mixture to said third zone of said chamber and further continuously mixing said mixture at a higher temperature relative to a temperature of said first zone;
   transporting said mixture to said devolatilization zone and extracting a first amount of both the low boiling point and additional solvents from the mixture in said devolatilization zone by heating the mixture to a devolatilization temperature that is above the normal, atmospheric boiling points of both said low boiling point and additional solvents;
   extruding said mixture through said die to produce a celluloid article; and
   removing a second amount of the low boiling point and additional solvents from said celluloid article.

2. The process of claim 1, wherein the first zone is maintained at a temperature between about 5° C. and about 15° C., and wherein the second zone has a temperature of about 50° C. to about 60° C.

3. The process of claim 1 wherein the third zone has a temperature of about 60° C. to about 80° C.

4. The process of claim 1 wherein the devolatilization zone has a temperature of about 75° C. to about 90° C.

5. The process of claim 1 wherein at least one of the zones has higher rate of mixing as compared to at least one other of the zones.

6. The process of claim 1 wherein the extruding occurs at a rate of 5 millimeters per second to about 50 millimeters per second.

7. The process of claim 1 wherein the solvents are removed from the celluloid article using at least one warm water bath.

8. The process of claim 1 wherein the celluloid article is a sheet, a rod or a tube.

9. A continuous extrusion process for preparing celluloid articles comprising the steps of:
   providing a quantity of nitrocellulose;
   providing a quantity of camphor;
   providing an extruder defining a chamber, an opening for receiving materials into said chamber, means for mixing material in said chamber, and an extrusion die coupled to said chamber for extruding material located in said chamber; said chamber comprising a first zone, a second zone and a devolatilization zone or a combination thereof;
   introducing the nitrocellulose into said first zone of said chamber, said first zone being maintained at a temperature where the nitrocellulose will not ignite;
   dissolving said camphor in a low boiling point solvent selected from the group consisting of: methanol, ethanol, acetone, and mixtures thereof, to form a camphor solution, and introducing said camphor solution into said first zone or said second zone of said chamber;
   adding an additional solvent to said first zone or said second zone;
   transporting said nitrocellulose into said second zone of said chamber;
   continuously mixing said nitrocellulose, camphor solution and additional solvent in said second zone to form a mixture;
   transporting said mixture to said devolatilization zone and extracting a first amount of both the low boiling point and additional solvents from the mixture in said devolatilization zone by heating the mixture to a devolatilization temperature that is above the normal, atmospheric boiling points of both said low boiling point and additional solvents;
   extruding said mixture through said die to produce a celluloid article; and
   removing a second amount of both the low boiling point and additional solvents from said celluloid article.

* * * * *